United States Patent
Lee et al.

(10) Patent No.: US 11,170,267 B1
(45) Date of Patent: Nov. 9, 2021

(54) METHOD, SYSTEM AND COMPUTER PROGRAM PRODUCT FOR REGION PROPOSALS

(71) Applicant: MOTOROLA SOLUTIONS, INC., Chicago, IL (US)

(72) Inventors: Chia Ying Lee, Medford, MA (US); Ying Wang, Woburn, MA (US); Weijuan Wu, Winchester, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/893,511

(22) Filed: Jun. 5, 2020

(51) Int. Cl.
  *G06K 9/62* (2006.01)
  *G06K 9/00* (2006.01)
  *G06K 9/20* (2006.01)

(52) U.S. Cl.
  CPC ........ *G06K 9/6262* (2013.01); *G06K 9/00711* (2013.01); *G06K 9/2054* (2013.01); *G06K 9/6257* (2013.01)

(58) Field of Classification Search
  CPC ............ G06K 9/6262; G06K 9/00711; G06K 9/2054; G06K 9/6257
  USPC ...................................................... 382/157
  See application file for complete search history.

(56) References Cited

U.S. PATENT DOCUMENTS

| | | | |
|---|---|---|---|
| 9,996,890 B1 | 6/2018 | Cinnamon et al. | |
| 10,504,261 B2 | 12/2019 | Cinnamon et al. | |
| 10,572,963 B1 | 2/2020 | Cinnamon et al. | |
| 10,803,364 B2 | 10/2020 | Fukagai | |
| 2018/0121729 A1* | 5/2018 | Chang | G06K 9/6277 |
| 2019/0019318 A1 | 1/2019 | Cinnamon et al. | |
| 2019/0050694 A1 | 2/2019 | Fukagai | |
| 2019/0236372 A1 | 8/2019 | Stone et al. | |
| 2020/0097769 A1 | 3/2020 | Lipchin et al. | |

OTHER PUBLICATIONS

Stone et al., "Towards Scalable Video Analytics at the Edge" 2019 16th Annual IEEE International Conference on Sensing, Communication, and Networking (SECON) (Jun. 10, 2019), all pages.
Diba et al., "Weakly Supervised Cascaded Convolutional Networks": 1-10 (Jul. 2017), all pages.
Zhu et al., "Soft Proposal Networks for Weakly Supervised Object Localization" ICCV 2017:1841-1850 (Sep. 6, 2017), all pages.
Uijlings et al., "Selective Search for Object Recognition" International Journal of Computer Vision:1-14 (Sep. 2013), all pages.
Zhou et al., "Learning Deep Features for Discriminative Localization" CVPR2016:2921-2929 (Dec. 14, 2015).

* cited by examiner

*Primary Examiner* — Michael R Neff
(74) *Attorney, Agent, or Firm* — Daniel R. Bestor

(57) ABSTRACT

A method, system and computer program product for region proposals are disclosed. The method includes generating a map of a video frame by calculating a plurality of pixel-level values. Each pixel-level value corresponds to a respective one of a plurality of pixels and provides an associated indication of how likely the respective one of the plurality of pixels forms part of a particular object of interest.

16 Claims, 8 Drawing Sheets

METHOD, SYSTEM AND COMPUTER PROGRAM PRODUCT FOR REGION PROPOSALS

BACKGROUND

Automated security systems typically employ video cameras or other image capturing devices or sensors to collect image data such as video or video footage. In the simplest systems, images represented by the image data are displayed for contemporaneous screening by security personnel and/or recorded for later review after a security breach. In a typical security system, one may be interested in detecting objects of interest such as humans, vehicles, animals, etc. that move through the environment.

Computer-implemented detection of objects in image data captured by the cameras can significantly facilitate the task of reviewing relevant video segments by the security personnel. That being said, computer-implemented analysis of video to detect and recognize objects requires substantial computing resources, especially as the desired accuracy increases.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
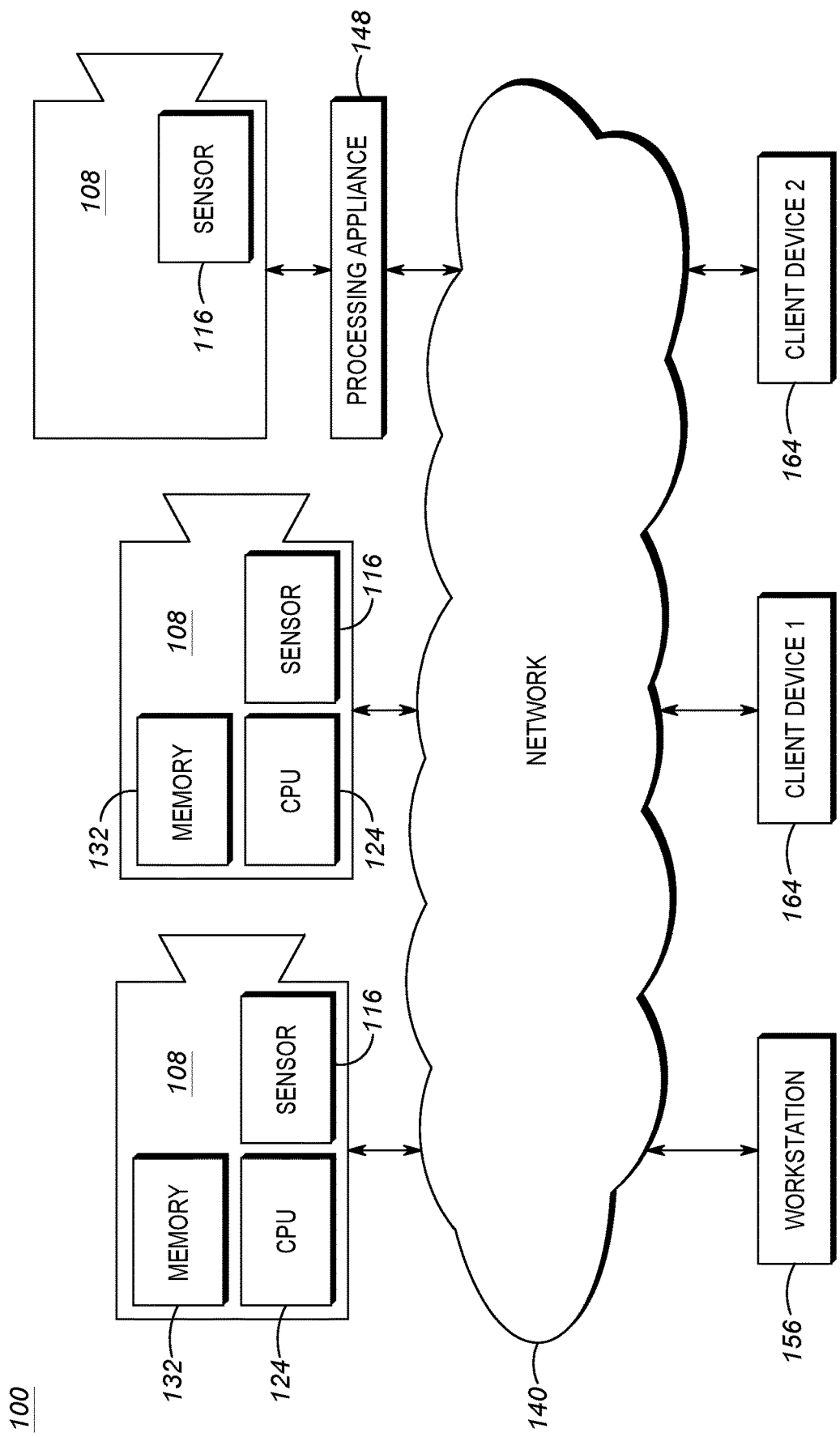
FIG. 1 shows a block diagram of a video capture and playback system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a video analytics-based object detection method carried out on a video frame that includes a plurality of pixels. The method includes generating a map of the video frame by calculating a plurality of pixel-level values. Each pixel-level value corresponds to a respective one of the plurality of pixels and provides an associated indication of how likely the respective one of the plurality of pixels forms part of a particular object of interest. The method also includes generating a plurality of proposals for bounding boxes, where each proposed bounding box of the proposals delimits a region (within the video frame) where the object of interest is defined to appear. The method also includes calculating a plurality of activation scores for respective proposals of the plurality of proposals. The method also includes determining that a first number of the proposals are selected proposals and that a second remaining number of the proposals are unselected proposals, and the determining is based on the first number of the proposals having higher respective activation scores than the second remaining number of the proposals. The method also includes providing the first number of the proposals to a learning machine to carry out a next stage in detecting the object of interest.

In accordance with another example embodiment, there is provided at least one tangible, non-transitory, computer-readable storage medium having instructions encoded therein. The instructions, when executed by at least one processor, cause a carrying out of a method that includes generating a map of a video frame by calculating a plurality of pixel-level values. Each pixel-level value corresponds to a respective one of a plurality of pixels and provides an associated indication of how likely the respective one of the plurality of pixels forms part of a particular object of interest. A plurality of proposals for bounding boxes are generated. Each proposed bounding box of the proposals delimits a region (within the video frame) where the object of interest is defined to appear. A plurality of activation scores are calculated for respective proposals of the plurality of proposals. A first number of the proposals are determined to be selected proposals. A second remaining number of the proposals are determined to unselected proposals, and determination is based on the first number of the proposals having higher respective activation scores than the second remaining number of the proposals. The first number of the proposals are provided to a learning machine to carry out a next stage in detecting the object of interest.

In accordance with yet another example embodiment, there is provided a video camera that includes an image sensor configured to capture a video frame that includes a plurality of pixels. The video camera also includes at least one tangible, non-transitory, computer-readable storage medium having instructions encoded therein. The video camera also includes at least one processor communicatively coupled to the image sensor and the computer-readable storage medium. The at least one processor is configured to receive the video frame as input and to execute the instructions to carry out a method that includes generating a map of the video frame by calculating a plurality of pixel-level values, each pixel-level value corresponding to a respective one of the plurality of pixels and providing an associated indication of how likely the respective one of the plurality of pixels forms part of a particular object of interest. The method also includes generating a plurality of proposals for bounding boxes, each proposed bounding box of the proposals delimiting a region, within the video frame, where the object of interest is defined to appear. The method also includes calculating a plurality of activation scores for respective proposals of the plurality of proposals. The method also includes determining that a first number of the proposals are selected proposals and that a second remaining number of the proposals are unselected proposals, and the determining is based on the first number of the proposals have higher respective activation scores than the second remaining number of the proposals. The method also includes providing the first number of the proposals to a learning machine to carry out a next stage in detecting the object of interest.

Each of the above-mentioned embodiments will be discussed in more detail below, starting with example system and device architectures of the system in which the embodiments may be practiced, followed by an illustration of processing blocks for achieving an improved technical method, device, and system for region proposals.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to FIG. 1, therein illustrated is a block diagram of connected devices of a video capture and playback system 100 according to an example embodiment. For example, the video capture and playback system 100 may be used as a video security system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 (or camera 108) is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a security camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video gaming apparatus.

Each video capture device 108 includes one or more processors 124 (or CPUs 124), one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a Digital Signal Processor (DSP), Graphics Processing Unit (GPU) or Vision Processing Unit (VPU), embedded processor, etc., and any suitable combination thereof operating independently or in parallel, including possibly operating redundantly. Such processing circuit may be implemented by one or more integrated circuits (IC), including being implemented by a Monolithic Integrated Circuit (MIC), an Application Specific Integrated Circuit (ASIC), a Field Programmable Gate Array (FPGA), etc. or any suitable combination thereof. Additionally or alternatively, such processing circuit may be implemented as a Programmable Logic Controller (PLC), for example. The processor may include storage circuitry, for storing data, and may comprise memory circuit(s) or be in wired communication with the memory circuit(s), for example.

In various example embodiments, the memory device 132 is coupled to the CPU 124 and is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, Universal Serial Bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the video capture device 108 may be implemented together within a System On a Chip (SOC). For example, the processor 124, the memory device 132 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor such as, for example, a Central Processing Unit (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have the memory 132 or the CPU 124 to process image data. The processing appliance 148 may be further connected to the network 140. Each processing appliance 148 may work cooperatively with any suitable number of video capture devices 108 that the processing appliance 148 can support.

According to one exemplary embodiment, and as illustrated in FIG. 1, the video capture and playback system 100 includes at least one workstation 156 (such as, for example, a server), each having one or more processors including GPUs. The at least one workstation 156 may also include storage memory. The workstation 156 receives image data from at least one video capture device 108 and performs processing of the image data. The workstation 156 may further send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, Personal Data Assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 156 and one or more client devices 164.

In some examples, the video capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2:
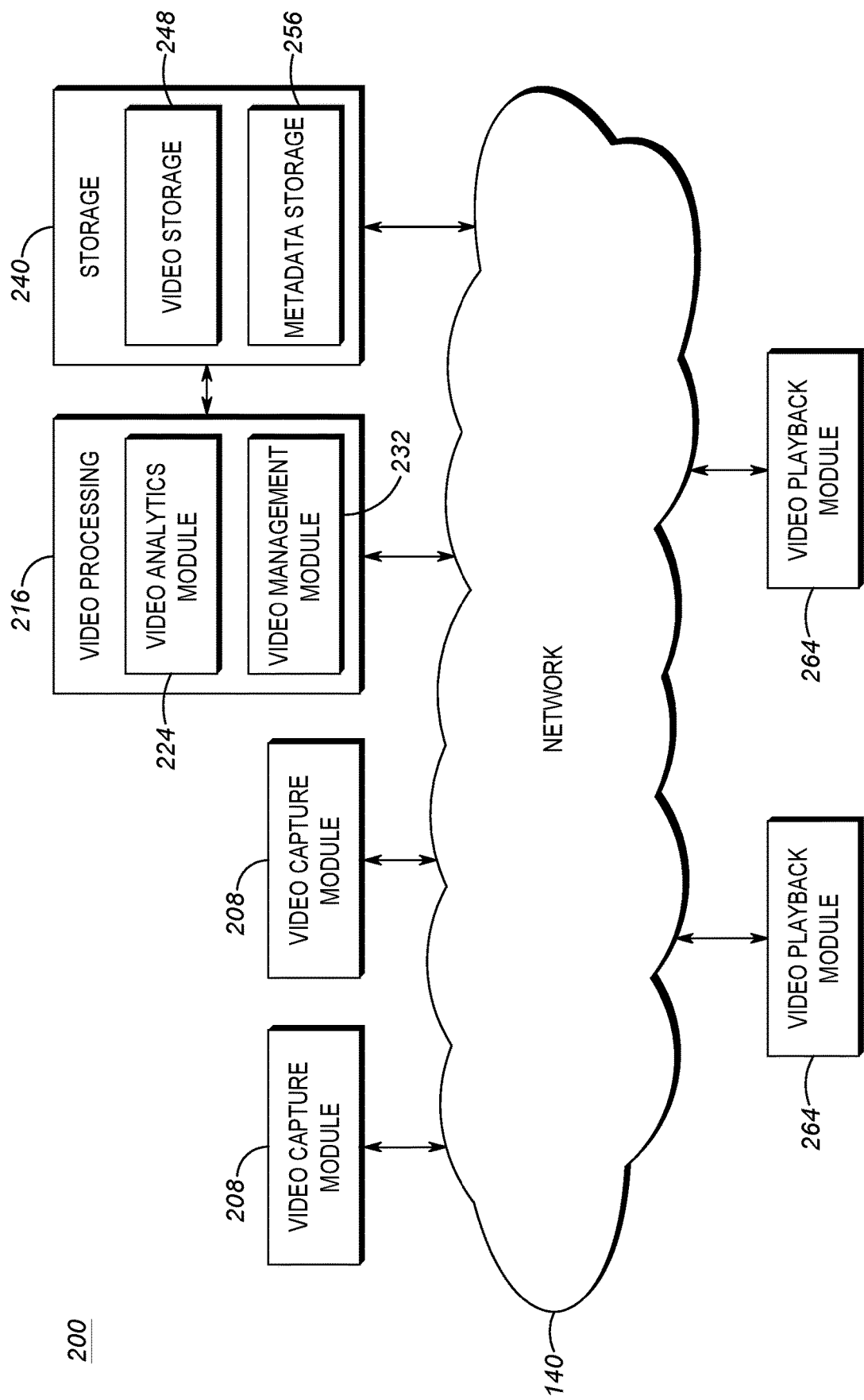
FIGS. 2 and 3 show block diagrams of operational modules of the video capture and playback system in accordance with example embodiments.

Referring now to FIG. 2, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion detection, appearance matching, characteristic (facet) searching, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the video capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an video capture device 108, processing appliance 148 and workstation 156. Similarly, video management functionalities may be split between one or more of an video capture device 108, processing appliance 148 and workstation 156.

Figure 3:
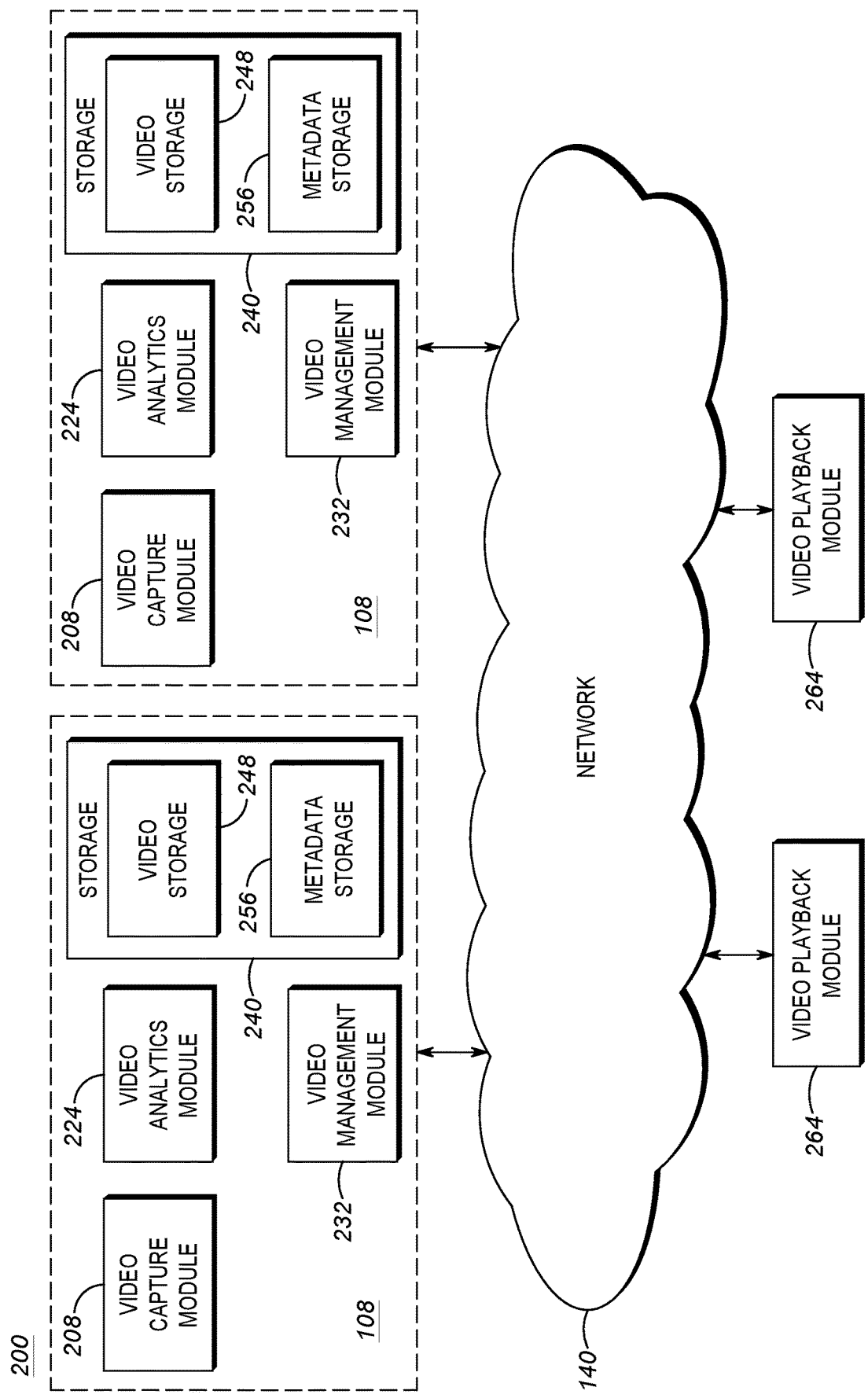

Referring now to FIG. 3, therein illustrated is a block diagram of a set 200 of operational modules of the video capture and playback system 100 according to one particular example embodiment wherein the video analytics module 224, the video management module 232 and the subset 240 of storage modules is wholly implemented on the one or more video capture devices 108. Alternatively, the video analytics module 224, the video management module 232 and the subset 240 of storage modules are wholly or partially implemented on one or more processing appliances 148.

It will be appreciated that allowing the subset 216 of image data (video) processing modules to be implemented on a single device or on various devices of the video capture and playback system 100 allows flexibility in building the video capture and playback system 100. For example, one may choose to use a particular device having certain functionalities with another device lacking those functionalities. This may be useful when integrating devices from different parties (such as, for example, manufacturers) or retrofitting an existing video capture and playback system.

The video capture device 108 may be considered to be an "edge" device, whereas the workstation 156 may be considered to be a "central" device. Strategic placement of the image data processing modules may have beneficial effects such as, for example, improved performance in relation to real-time applications.

Figure 4:
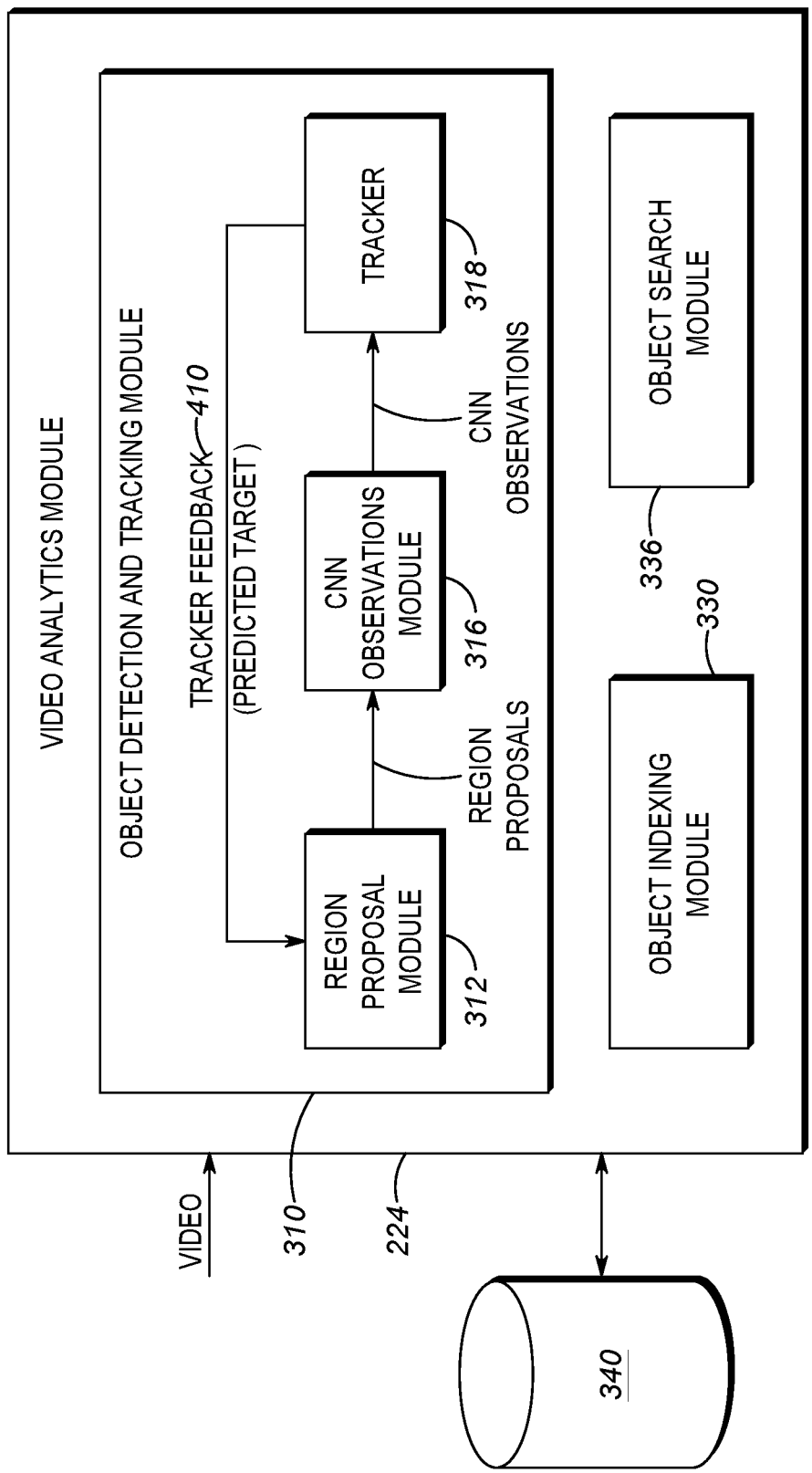
FIG. 4 shows a block diagram of a set of operational modules of a video analytics module implemented in the video capture and playback system according to an example embodiment.

Reference is now made to FIG. 4. FIG. 4 shows a block diagram of a set of operational modules of the video analytics module 224 implemented in the video capture and playback system 100. The video analytics module 224 includes a number of modules for performing various tasks. For example, the video analytics module 224 includes an object detection and tracking module 310. Amongst other things, the object detection and tracking module 310 operates to detect objects appearing in the Field Of View (FOV) of the video capturing device 108 and also generate a location and classification score (or confidence) of each detected object. The object detection and tracking module 310 may employs one or more Convolutional Neural Networks (CNNs) that have been pre-trained for detection of multiple objects and classification. The object detection and tracking module 310 may also employ any known object detection method such as motion detection and blob detection. The object detection and tracking module 310 may, in some examples, employ the detection methods described in U.S. Pat. No. 7,627,171 entitled "Methods and Systems for Detecting Objects of Interest in Spatio-Temporal Signals". A visual object may be classified, such as a person, a car or an animal. Additionally or alternatively, a visual object may be classified by action, such as movement and direction of movement of the visual object. Other classifiers may also be determined, such as color, size, orientation, etc. In some examples, classifying the visual object may include identifying a person based on facial detection and/or recognizing text such as, for instance, a license plate. In some examples, visual classification may be performed according to teachings and methods described in U.S. Pat. No. 8,934,709 entitled "Dynamic Object Classification".

The object detection and tracking module 310 also operates to temporally associate instances of a detected object. In this regard, the object detection and tracking module 310 includes a tracker 318 configured to perform object tracking using the outputs of a CNN observation module 316 and also to provide tracker feedback 410 that is received by a region proposal module 312. The tracker 318 is operable to predict locations of targets in the next frame that are used by the object detection and tracking module. The term "target" herein refers to a particular object contained in video frames. In some examples, the object detection and tracking module 310 may further employ any other tracking methods such as those described in U.S. Pat. No. 8,224,029 entitled "Object Matching for Tracking, Indexing, and Search". The object detection and tracking module 310 may generate metadata corresponding to visual objects it tracks. This metadata may be stored in a storage system 340. Furthermore, this metadata may correspond to signatures of the visual object representing the object's appearance or other features. The metadata may be transmitted between connected devices on a network such as, for example, from the video capture device 108 to a server (elsewhere on the network) for processing.

In an alternative example embodiment, the video analytics module 224 may use facial recognition (as is known in the art) to detect faces in the images of humans and accordingly provide confidence levels. Further, a part of an object, such as an ear of a human, may be detected in a manner known to those skilled in the art.

The video analytics module 224 may also include an object indexing module 330 connected to the storage system 340. The object indexing module 330 is operable to generate signatures for objects. The signatures may be stored in, for example, a metadata database in the storage system 340 and may act as index elements for video images of the objects. The video analytics module 224 also includes an object search module 336 connected to the storage system 340. The object search module 336 may search through signatures stored in the storage system 340 to identify an object in the previously captured images. The video analytics module 224 may, in some examples, include modules for filtering out certain types of objects for further processing.

Still with reference to FIG. 4, the region proposal module 312 provides region proposals to the CNN observations module 316 which, in at least some example embodiments, are generated by employing heatmaps. Heatmap generation can be carried out in a number of different manners known to those skilled in the art. For example, heatmap generation may be carried out as described in Zhou et al, "Learning Deep Features for Discriminative Localization", CVPR2016, pgs. 2921-2929 (Dec. 14, 2015). As another example, heatmap generation may be carried out as described in Zhu et al., "Soft Proposal Networks for Weakly Supervised Object Localization", ICCV 2017, pgs. 1841-1850 (Sep. 6, 2017). These two example heatmap generation methods may be characterized as carrying out weakly supervised object localization based on CNNs. They work by extracting convolutional feature maps for an input image, and combining them using learned CNN weights. The resulting heatmap is a spatial distribution of discriminative patterns for the image classes, and indicates the parts of a frame that contribute most to the classification of the input image. Suitable alternative heatmap generations are also contemplated including, for instance, hybrids of the above-mentioned heatmap generation methods and/or methods employing the tracker feedback 410 and/or methods employing motion information.

Figure 5:
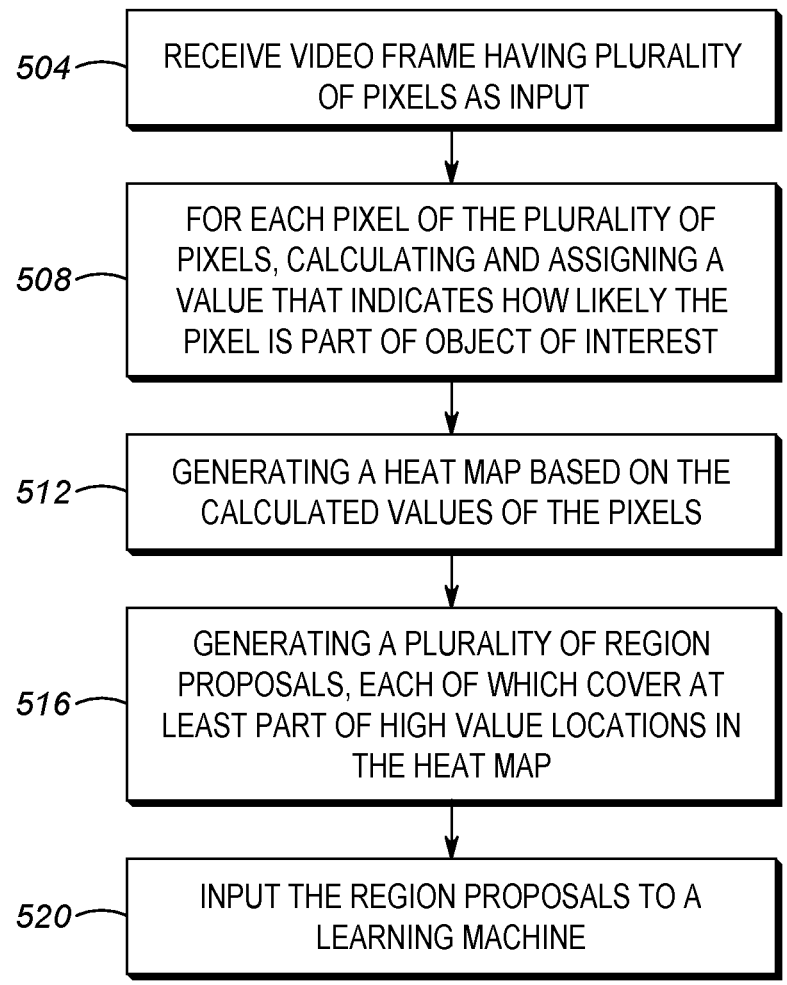
FIG. 5 is a flow chart of a method for region proposal generation in accordance with an example embodiment.
Figure 6:
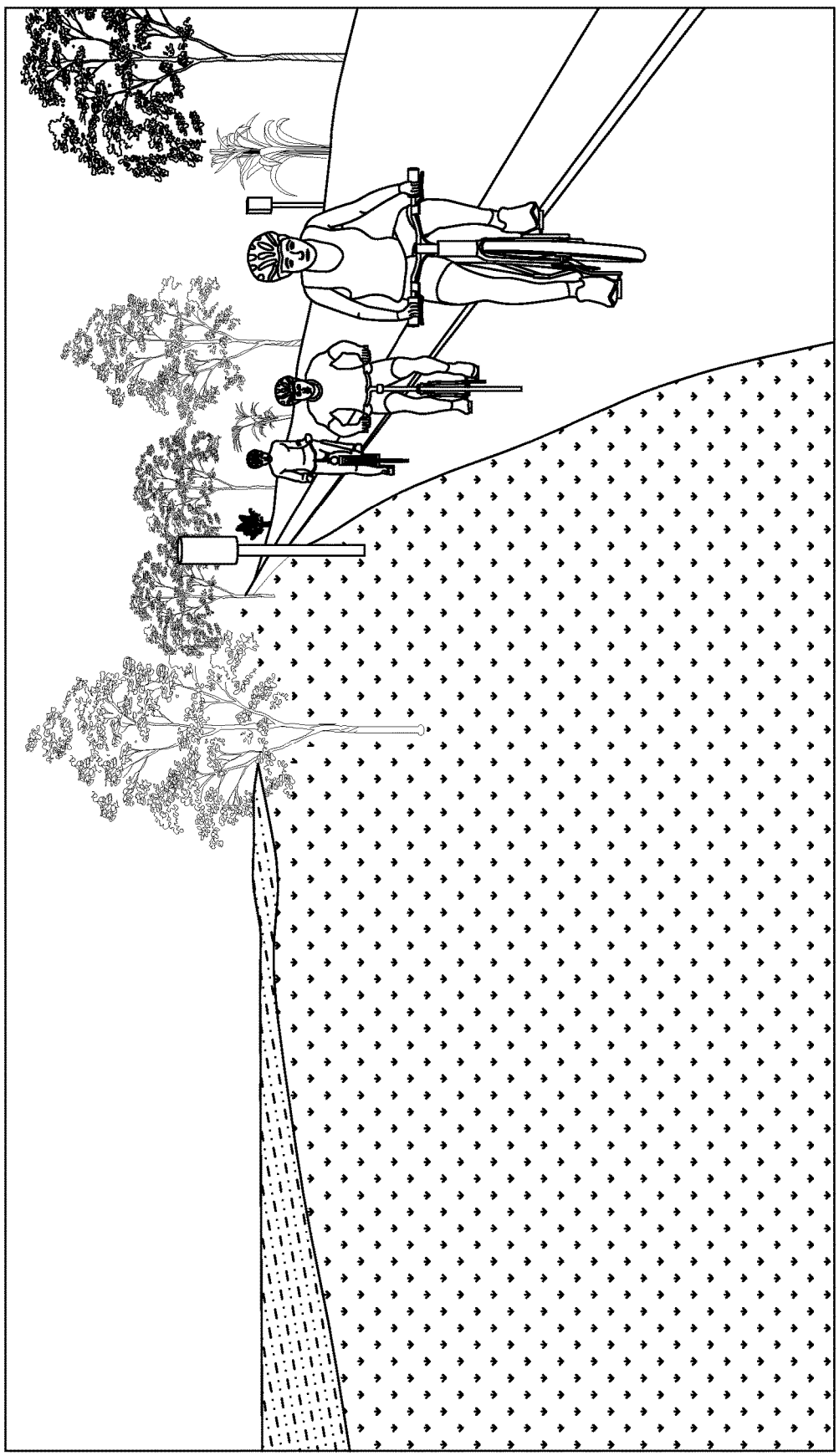
FIG. 6 shows a diagram of a video frame received by a region proposal module in accordance with an example embodiment.

Reference is now made to FIG. 5. FIG. 5 is a flow chart of a method 500 for region proposal generation in accordance with an example embodiment. First, a video frame (for example, video frame 600 shown in FIG. 6 having a plurality of pixels) is received (504) as input.

Next, for each pixel of the plurality of pixels, a value is calculated and assigned (508). The value is indicative of how likely the pixel is part of an object of interest (for example, the value is indicative of the degree to which the pixel predicts the presence of the object of interest).

Figure 7:
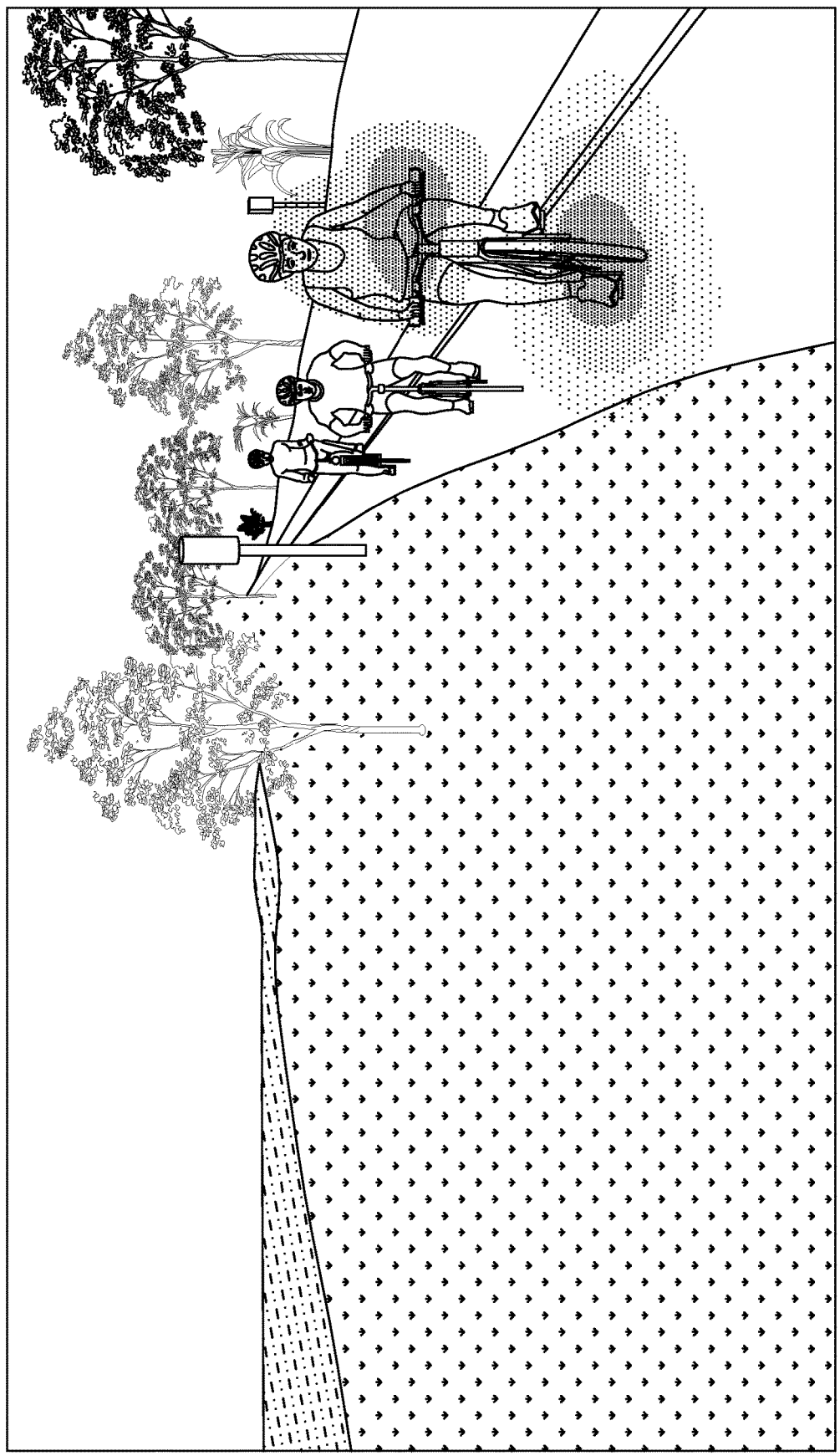
FIG. 7 shows a diagram of a heatmap, in accordance with an example embodiment, corresponding to the video frame shown in FIG. 6.

Next, a heatmap (for example, heatmap 700 shown in FIG. 7) is generated (512) based on the calculated values of the pixels.

Figure 8:
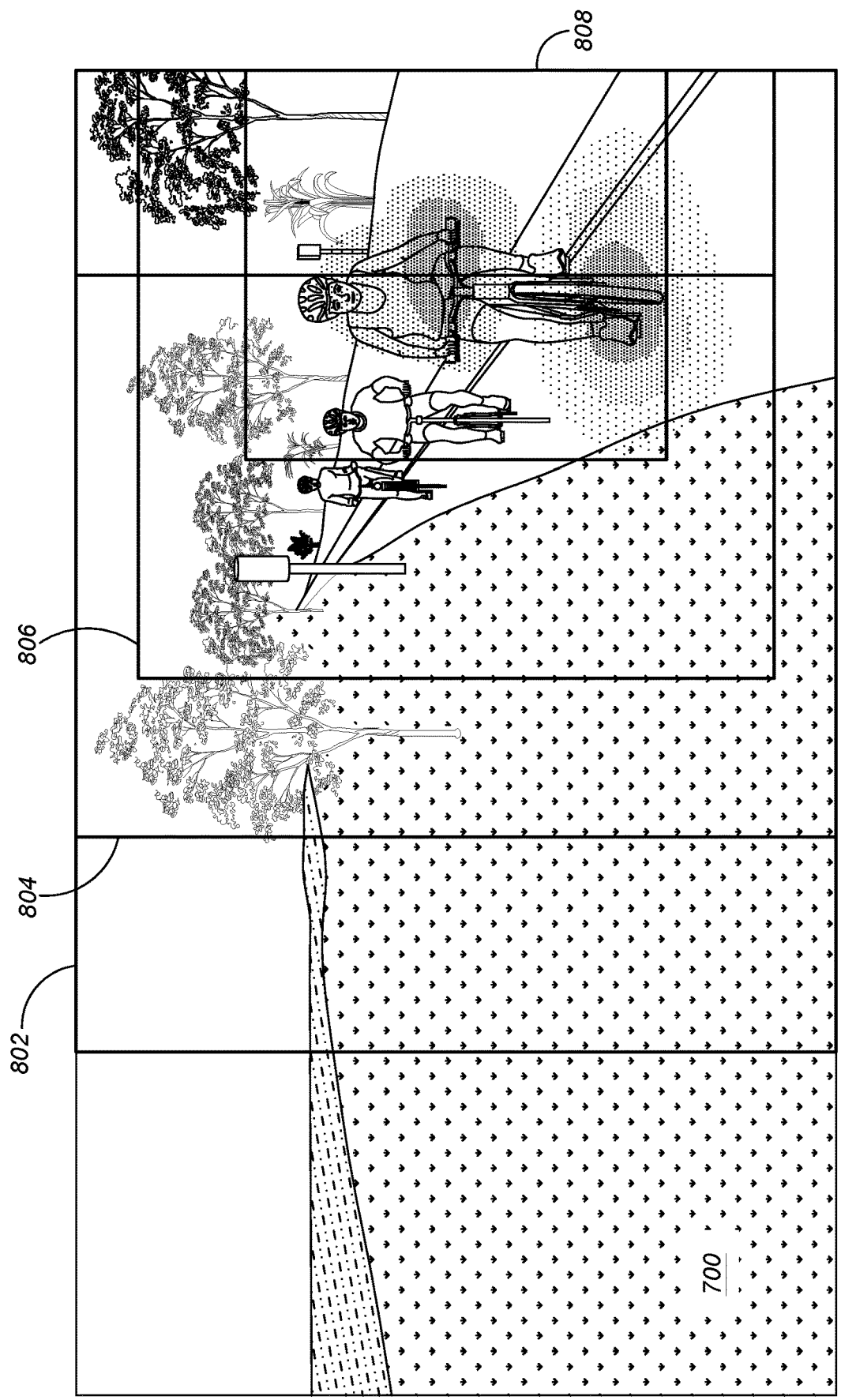
FIG. 8 show a diagram of example region proposals diagrammatically overlaid over the heatmap of FIG. 7.

Next, a plurality of region proposals are generated (516), each of which cover at least part of high value locations in the heatmap. For example, in respect of the heatmap 700, four region proposals 802, 804, 806 and 808 are in FIG. 8. Region proposals are selected to cover the high activation areas of the heatmap. In the illustrated example embodiment the region proposals are characterized by bounding boxes which delineate a region of the video frame (i.e. pixels that are part of the object of interest versus pixels that are not part of the object of interest).

As will be appreciated by those skilled in the art, a collection of candidate region proposals may be pre-generated by a sliding window approach and conforming to the expected object size. Each candidate region proposal is scored to reward covering, and penalize missing, high activation areas.

In accordance with at least one example embodiment, the equation for the activation score for a Region Proposal (RP) is as follows:

$$ActivationScore(RP) = \frac{\frac{1}{\text{Area}(RP)}\sum_{(x,y)\in RP} M_c(x,y)}{\sum_{(x,y)\notin RP} M_c(x,y)} \quad (1)$$

In the above, $M_c(x, y)$ is the heatmap for the frame. Also, RP is typically not the entire frame, and therefore the denominator will not be zero.

Also, the activation score obtained from the above equation is the ratio of the average activation within the RP to the total activation outside the RP. This score favors tight RPs around high activation areas, while balancing the size of the RP to prevent it from being too small.

Continuing on, following the action 516 in FIG. 5 the top N candidate region proposals (where N is any suitable integer greater than one) are inputted (520) to a learning machine. For example, the region proposals 802, 804, 806, 808 (i.e. N=4) may be inputted to the CNN observations module 316 (FIG. 4).

It will be understood that different approaches for selecting the top N candidate region proposals are contemplated. Two examples for selecting region proposals are as follows:

1) Batch Selection—this approach involves computing ActivationScore(RP) for all RPs and then selecting the top N RPs.

2) Sequential Selection—this approach involves selecting the RPs one at a time in a manner that aims to minimize the overlap of selected RPs. In particular, after k<N RPs have been selected, the $(k+1)^{th}$ RP is selected by first computing a new score for each of the unselected RPs as follows:

$$ActivationScore_k(RP) = \frac{\frac{1}{\text{Area}(RP - S_k)}\sum_{\{(x,y)\in RP \text{ and } (x,y)\notin s_k\}} M_c(x,y)}{\sum_{\{(x,y)\notin RP \text{ and } (x,y)\notin s_k\}} M_c(x,y)} \quad (2)$$

where $S_k = \cup_{i=1}^{k} RP_k$ is the union of the regions covered by the first k selected RPs.

$RP-S_k$ is the region inside the unselected RP but outside the k selected RPs.

The summation in the numerator is over the region inside the unselected RP but outside the k selected RPs.

The summation in the denominator is over the region outside both the unselected RP and the k selected RPs.

The currently unselected RP with the top Activation-Score$k$(RP) is selected as the $(k+1)^{th}$ RP.

The above is repeated until N RPs have been selected.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot electronically communicate region proposals to a convolution neural network, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and Field Programmable Gate Arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a Local Area Network (LAN) or a Wide Area Network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A video analytics-based object detection method carried out on a video frame that includes a plurality of pixels, the method comprising:
   generating a map of the video frame by calculating a plurality of pixel-level values, each pixel-level value corresponding to a respective one of the plurality of pixels and providing an associated indication of how likely the respective one of the plurality of pixels forms part of a particular object of interest;
   generating a plurality of proposals for bounding boxes, each proposed bounding box of the proposals delimiting a region, within the video frame, where the object of interest is defined to appear;
   calculating a plurality of activation scores for respective proposals of the plurality of proposals, and the calculating including increasing a scoring in respect of a given proposal of the plurality of proposals where the given proposal includes a first number of pixels of the plurality of pixels having respective higher pixel-level values than respective pixel-level values of a second remaining number of pixels of the plurality of pixels;
   determining that a first number of the proposals are selected proposals and that a second remaining number of the proposals are unselected proposals, wherein the determining is based on the first number of the proposals having higher respective activation scores than the second remaining number of the proposals; and
   providing the first number of the proposals to a learning machine to carry out a next stage in detecting the object of interest.

2. The video analytics-based object detection method as claimed claim 1 wherein the calculating further includes further increasing the scoring in respect of the given proposal where the given proposal excludes the second remaining number of pixels of the plurality of pixels.

3. The video analytics-based object detection method as claimed claim 1 wherein the calculating of the plurality of activation scores and the determining are carried out in a fashion that at least substantially accomplishes batch selection.

4. The video analytics-based object detection method as claimed claim 1 wherein the calculating of the plurality of activation scores and the determining are carried out in a fashion that at least substantially accomplishes sequential selection.

5. The video analytics-based object detection method as claimed claim 4 wherein the calculating factors in an amount of pixel overlap of a given proposal with a number of the selected proposals that were prior-selected in the sequential selection, and the calculating rewards the given proposal if the amount of pixel overlap is lower in comparison to competing proposals of the plurality of proposals.

6. The video analytics-based object detection method as claimed claim 1 wherein the learning machine includes a convolutional neural network.

7. At least one tangible, non-transitory, computer-readable storage medium having instructions encoded therein, wherein the instructions, when executed by at least one processor, cause a carrying out of a method comprising:
   generating a map of a video frame by calculating a plurality of pixel-level values, each pixel-level value corresponding to a respective one of a plurality of pixels and providing an associated indication of how likely the respective one of the plurality of pixels forms part of a particular object of interest;
   generating a plurality of proposals for bounding boxes, each proposed bounding box of the proposals delimiting a region, within the video frame, where the object of interest is defined to appear;
   calculating a plurality of activation scores for respective proposals of the plurality of proposals, and the calculating including increasing a scoring in respect of a given proposal of the plurality of proposals where the given proposal includes a first number of pixels of the plurality of pixels having respective higher pixel-level values than respective pixel-level values of a second remaining number of pixels of the plurality of pixels;
   determining that a first number of the proposals are selected proposals and that a second remaining number of the proposals are unselected proposals, wherein the determining is based on the first number of the proposals having higher respective activation scores than the second remaining number of the proposals; and
   providing the first number of the proposals to a learning machine to carry out a next stage in detecting the object of interest.

8. The computer-readable storage medium as claimed in claim 7 wherein the calculating further includes further increasing the scoring in respect of the given proposal where the given proposal excludes the second remaining number of pixels of the plurality of pixels.

9. The computer-readable storage medium as claimed in claim 7 wherein the calculating of the plurality of activation scores and the determining are carried out in a fashion that at least substantially accomplishes batch selection.

10. The computer-readable storage medium as claimed in claim 7 wherein the calculating of the plurality of activation scores and the determining are carried out in a fashion that at least substantially accomplishes sequential selection.

11. The computer-readable storage medium as claimed in claim 10 wherein the calculating factors in an amount of pixel overlap of a given proposal with a number of the selected proposals that were prior-selected in the sequential selection, and the calculating rewards the given proposal if the amount of pixel overlap is lower in comparison to competing proposals of the plurality of proposals.

12. A video camera comprising:
an image sensor configured to capture a video frame that includes a plurality of pixels;
at least one tangible, non-transitory, computer-readable storage medium having instructions encoded therein; and
at least one processor communicatively coupled to the image sensor and the computer-readable storage medium, the at least one processor being configured to receive the video frame as input and to execute the instructions to carry out a method comprising:
generating a map of the video frame by calculating a plurality of pixel-level values, each pixel-level value corresponding to a respective one of the plurality of pixels and providing an associated indication of how likely the respective one of the plurality of pixels forms part of a particular object of interest;
generating a plurality of proposals for bounding boxes, each proposed bounding box of the proposals delimiting a region, within the video frame, where the object of interest is defined to appear;
calculating a plurality of activation scores for respective proposals of the plurality of proposals, and the calculating including increasing a scoring in respect of a given proposal of the plurality of proposals where the given proposal includes a first number of pixels of the plurality of pixels having respective higher pixel-level values than respective pixel-level values of a second remaining number of pixels of the plurality of pixels;
determining that a first number of the proposals are selected proposals and that a second remaining number of the proposals are unselected proposals, wherein the determining is based on the first number of the proposals having higher respective activation scores than the second remaining number of the proposals; and
providing the first number of the proposals to a learning machine to carry out a next stage in detecting the object of interest.

13. The video camera as claimed in claim 12 wherein the calculating further includes further increasing the scoring in respect of the given proposal where the given proposal excludes the second remaining number of pixels of the plurality of pixels.

14. The video camera as claimed in claim 12 wherein the calculating of the plurality of activation scores and the determining are carried out in a fashion that at least substantially accomplishes batch selection.

15. The video camera as claimed in claim 12 wherein the calculating of the plurality of activation scores and the determining are carried out in a fashion that at least substantially accomplishes sequential selection.

16. The video camera as claimed in claim 15 wherein the calculating factors in an amount of pixel overlap of a given proposal with a number of the selected proposals that were prior-selected in the sequential selection, and the calculating rewards the given proposal if the amount of pixel overlap is lower in comparison to competing proposals of the plurality of proposals.

* * * * *

UNITED STATES PATENT AND TRADEMARK OFFICE
CERTIFICATE OF CORRECTION

| | | |
|---|---|---|
| PATENT NO. | : 11,170,267 B1 | Page 1 of 1 |
| APPLICATION NO. | : 16/893511 | |
| DATED | : November 9, 2021 | |
| INVENTOR(S) | : Lee et al. | |

It is certified that error appears in the above-identified patent and that said Letters Patent is hereby corrected as shown below:

On the Title Page

After "(72) Inventors: Chia Ying Lee, Medford, MA (US);" delete "Ying" and substitute therefor -- Yin --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*